(12) United States Patent  
Weinstein et al.

(10) Patent No.: US 7,648,209 B2
(45) Date of Patent: Jan. 19, 2010

(54) SEAT BELT BUCKLE POSITIONING SYSTEM

(76) Inventors: Elisabeth Weinstein, 1702 Morton St., Ann Arbor, MI (US) 48104; Robert E. Weinstein, 177 Commonwealth Ave., Boston, MA (US) 02116

( * ) Notice: Subject to any disclaimer, the term of this patent is extended or adjusted under 35 U.S.C. 154(b) by 0 days.

(21) Appl. No.: 11/459,665

(22) Filed: Jul. 25, 2006

(65) Prior Publication Data
US 2007/0205644 A1 Sep. 6, 2007

Related U.S. Application Data

(60) Provisional application No. 60/808,347, filed on May 25, 2006, provisional application No. 60/785,121, filed on Mar. 23, 2006, provisional application No. 60/777,762, filed on Mar. 1, 2006.

(51) Int. Cl.
*A47D 1/10* (2006.01)
*A47D 15/00* (2006.01)

(52) U.S. Cl. ............... 297/482; 297/250.1; 297/256.16; 297/481

(58) Field of Classification Search ........... 297/481, 297/482, 250.1, 256.17, 256.16
See application file for complete search history.

(56) References Cited

U.S. PATENT DOCUMENTS

| | | | |
|---|---|---|---|
| 3,285,659 A * | 11/1966 | Robbins ..................... 297/482 |
| 4,057,181 A * | 11/1977 | Finnigan ................. 297/482 X |
| 4,345,791 A | 8/1982 | Bryans et al. |
| 4,521,052 A | 6/1985 | Cone |
| 4,743,063 A | 5/1988 | Foster, Jr. |
| 4,822,104 A * | 4/1989 | Plesniarski ............... 297/482 X |
| 4,878,277 A * | 11/1989 | Portuese ................. 297/482 X |
| 4,939,824 A * | 7/1990 | Reed ....................... 297/482 X |
| 5,476,286 A * | 12/1995 | Delfino .................... 297/482 X |
| 5,580,126 A | 12/1996 | Sedlack |
| 5,599,060 A | 2/1997 | Stephens et al. |
| 5,617,617 A * | 4/1997 | Gustin ..................... 297/482 X |
| 5,733,004 A | 3/1998 | Celestina-Krevh et al. |
| 5,797,654 A * | 8/1998 | Stroud ................. 297/250.1 X |
| 5,951,112 A * | 9/1999 | Hansson ..................... 297/482 |
| 6,116,649 A * | 9/2000 | Compton ................ 297/481 X |
| 6,588,365 B2 | 7/2003 | Best |
| 6,623,074 B2 | 9/2003 | Asbach et al. |
| 6,682,143 B2 | 1/2004 | Amirault et al. |
| 6,793,283 B1 | 9/2004 | Sipos |
| 6,866,342 B2 * | 3/2005 | Enomoto et al. ............. 297/482 |
| 6,908,151 B2 | 6/2005 | Meeker et al. |
| 7,004,362 B2 | 2/2006 | Boone |
| 7,148,809 B2 * | 12/2006 | Enomoto et al. ........ 297/482 X |
| 7,458,636 B2 * | 12/2008 | Chen et al. .............. 297/481 X |

(Continued)

FOREIGN PATENT DOCUMENTS

EP 0 328 614 B1 7/1992

(Continued)

*Primary Examiner*—Rodney B White
(74) *Attorney, Agent, or Firm*—Robert R. Deleault, Esq.; Mesmer & Deleault, PLLC

(57) ABSTRACT

A seat belt buckle positioning system for use with a child booster seat having a seat belt buckle holder that can grasp or envelope a vehicle seat belt buckle, and a seat belt buckle holder positioner to which the seat belt buckle holder can attach and be positioned at the side of the child booster seat.

17 Claims, 7 Drawing Sheets

U.S. PATENT DOCUMENTS

| | | |
|---|---|---|
| 2001/0004163 A1 | 6/2001 | Yamazaki |
| 2002/0000744 A1 | 1/2002 | Maciejczyk |
| 2002/0017808 A1 | 2/2002 | Kain |
| 2002/0145318 A1 | 10/2002 | Asbach et al. |
| 2003/0155797 A1 | 8/2003 | Amirault et al. |
| 2003/0192925 A1 | 10/2003 | Boone |
| 2004/0155500 A1 | 8/2004 | Amirault et al. |
| 2005/0012372 A1 | 1/2005 | Baloga et al. |

FOREIGN PATENT DOCUMENTS

| | | |
|---|---|---|
| EP | 0 549 115 A2 | 6/1993 |
| EP | 0 705 728 A2 | 4/1996 |
| EP | 0 927 659 A2 | 7/1999 |
| EP | 1 193 111 A2 | 4/2002 |
| EP | 1 442 924 A1 | 8/2004 |
| EP | 0 927 659 B1 | 4/2006 |
| GB | 2 268 394 A | 1/1994 |
| GB | 2 388 770 A | 11/2003 |
| JP | 05-254367 | 10/1993 |
| JP | 06-008762 | 1/1994 |
| WO | WO 82/01520 | 5/1982 |
| WO | WO 2004/080241 A2 | 9/2004 |
| WO | WO 2005/037605 A2 | 4/2005 |

\* cited by examiner

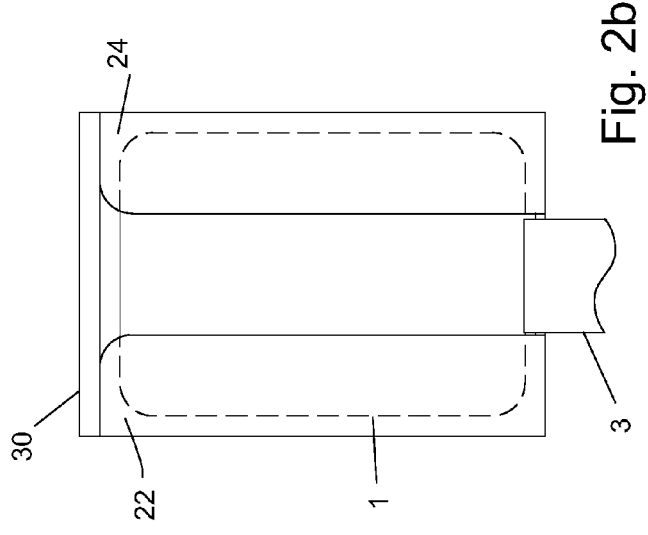
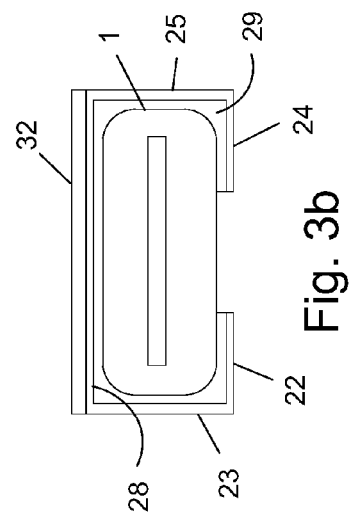
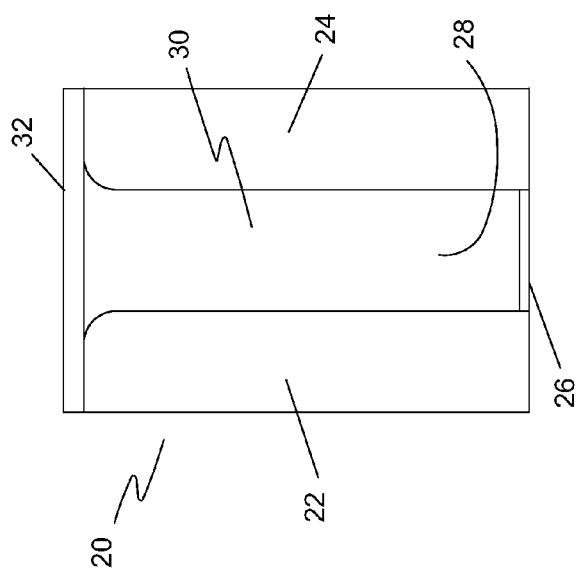
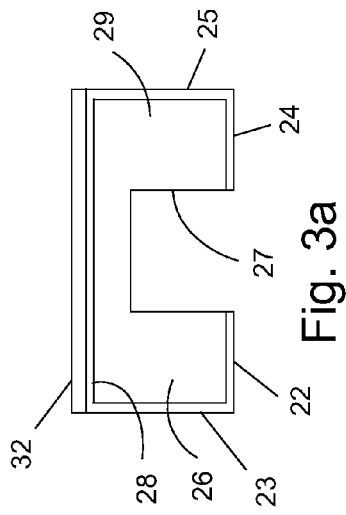

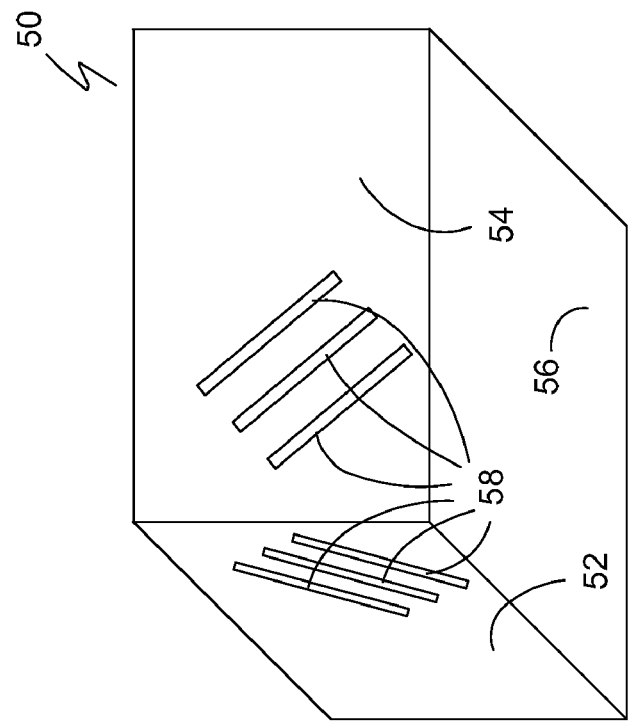
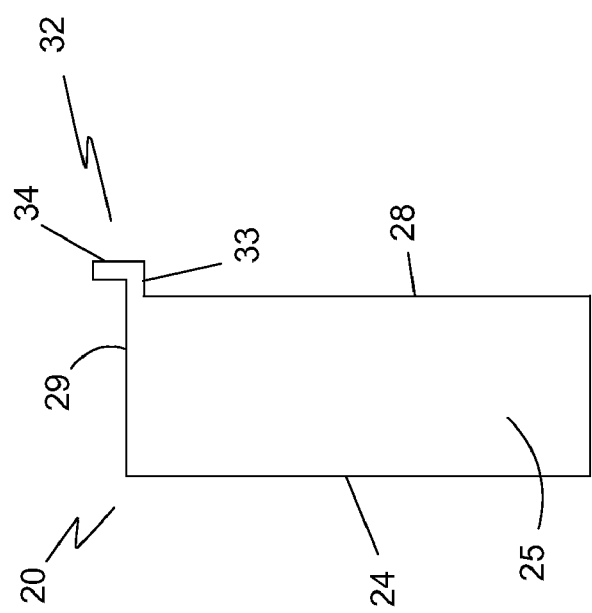

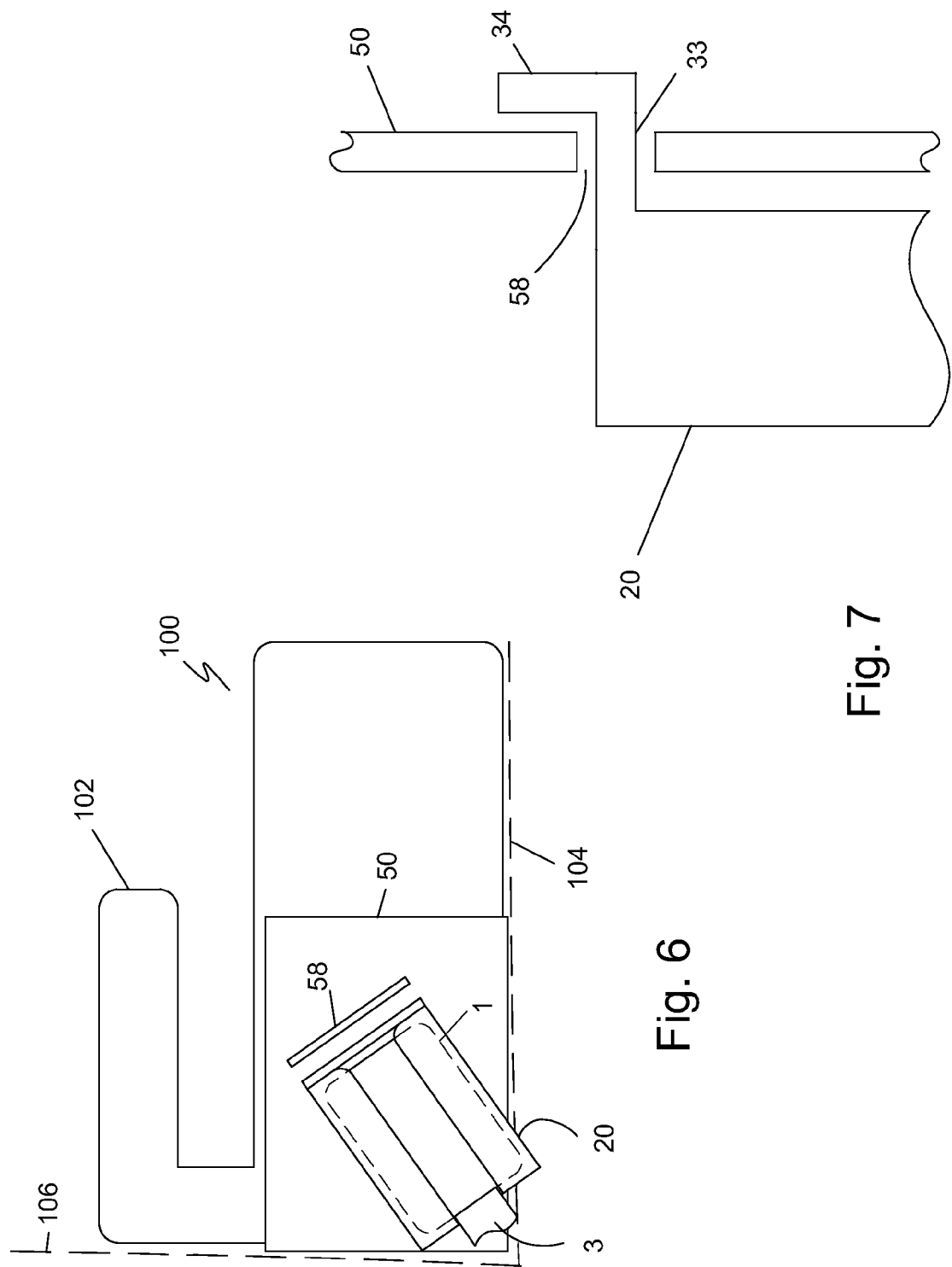

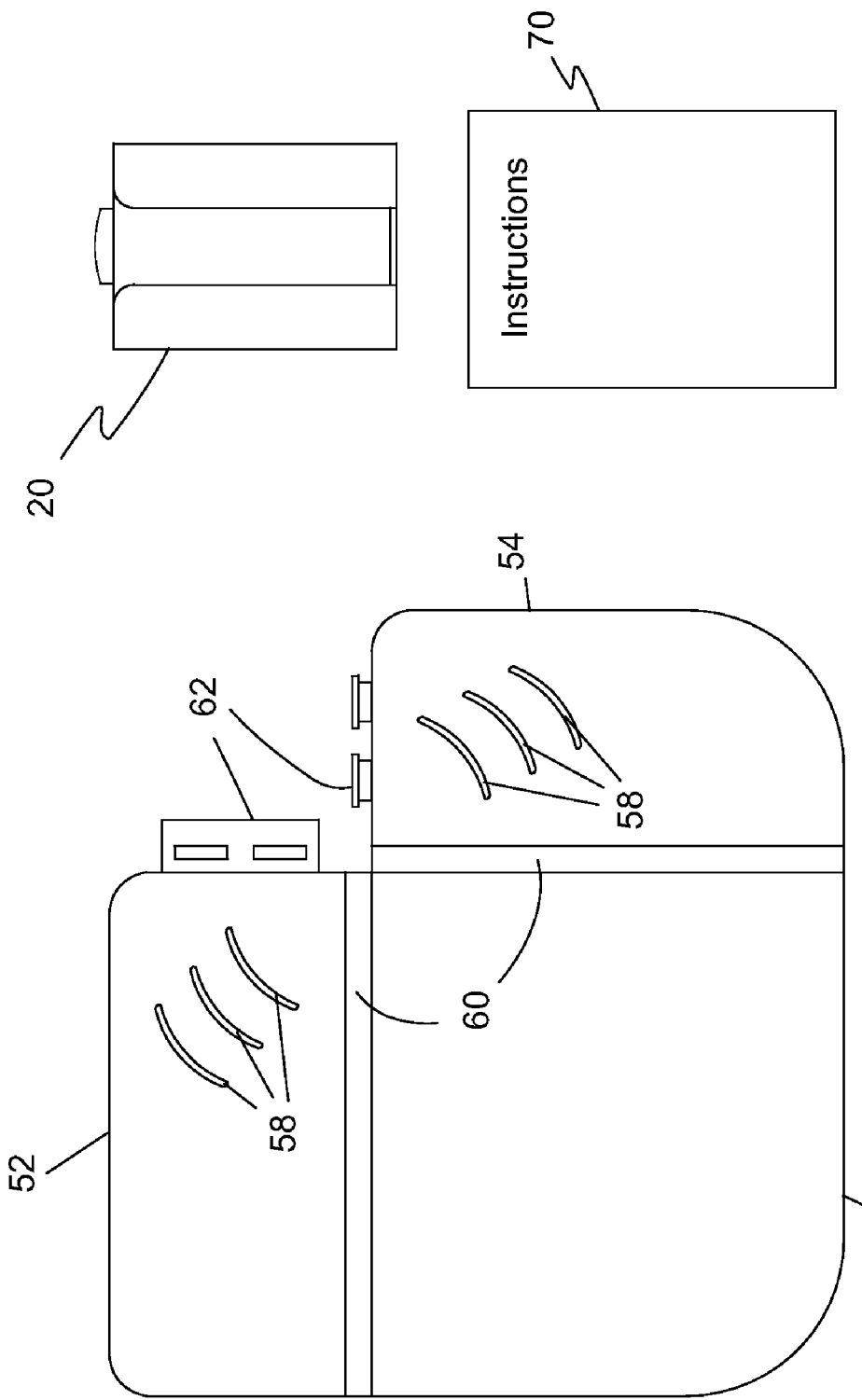

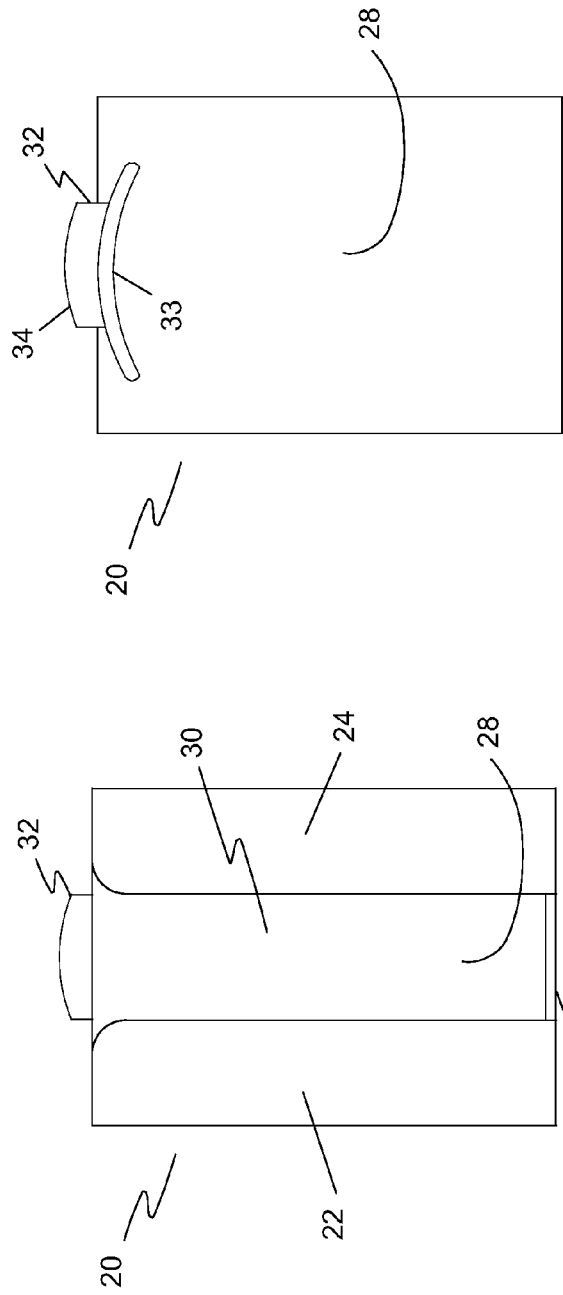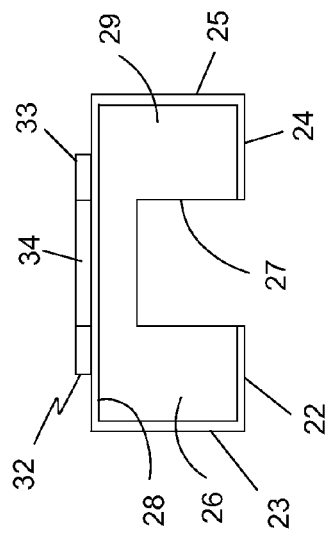

SEAT BELT BUCKLE POSITIONING SYSTEM

This application claims the benefit of U.S. Provisional Patent Application No. 60/777,762, filed Mar. 1, 2006, U.S. Provisional Patent Application No. 60/785,121, filed Mar. 23, 2006, and U.S. Provisional Patent Application No. 60/808,347, filed May 25, 2006.

BACKGROUND OF THE INVENTION

1. Field of the Invention

The present invention relates generally to automotive safety restraints. Particularly, the present invention relates to automotive safety restraints and their use with child booster seats.

2. Description of the Prior Art

It is well established that the use of restraints worn across the lap and chest, commonly referred to as "seat belts," increases the safety of individuals riding in motor vehicles, both for operators and passengers. In the United States, all states have laws regarding the use of such safety restraints. Some of these laws are regarded as "primary" meaning that, in States having such "primary" safety restraint laws, a citation can be written whenever a policeman sees a moving car without a seat belt being used. The remaining States have safety restraint laws considered "secondary," meaning that an officer cannot intervene for not using seat belts but can issue a citation for not doing so if the vehicle is stopped for another reason.

Special apparatus designed for infants and children weighing under 30-40 pounds are in common use. Referred to as "infant car seats," these are secured directly to the seat of the vehicle. The child is held within these "infant car seats" by appropriately sized restraints that are integral with the seat. For older children weighing over 30-40 pounds and too large to fit into an infant seat, booster seats that position the child to appropriately utilize adult seat belts are recommended for automotive safety. All states require safety seats for children under four years old, and many states require older children to use car booster seats, some mandating booster seat use up to age eight.

The National Highway Traffic Safety Administration (NHTSA) recommends the use of booster seats for all older children up to fifty-seven inches in height. Despite encouragement by safety organizations such as NHTSA, use of booster seats for children between the ages 4 to 8 has been reported to be below 20 % in contrast to the use of infant safety seats greater than 80 % for infants below the age of 4.

Some booster seats consist essentially of a child-sized seat on a low raised platform. An example of such a basic child booster seat is the Graco TurboBooster (Model 8491 SCT) produced by Graco Children's Products of Exton, Pa. This model has no back, and the child's back rests against the vehicle seat back. The Graco TurboBooster model incorporates armrests that also serve to position the child in the seat. Graco indicates this model to be appropriate for children between the ages of 3 and 10 years old, who weigh between 30 and 100 pounds, are between 38 and 57 inches in height, and whose ears are below the top of the vehicle seat cushion/headrest. The booster seat is placed freely upon the vehicle seat, and the child and booster seat are secured by buckling the seat belt of the vehicle about the child. Other examples of child booster seats without backs and similar in design to the Graco TurboBooster are the Cosco Ambassador (Model 220296-WAL) produced by Cosco, a division of Dorel Industries, Montreal, Canada, and Evenflo Big Kid (Model 2791694) produced by Evenflo Corporation of Piqua, Ohio.

Some booster seat models are more elaborate and have backs. These are exemplified by the Graco TurboBooster SafeSeat (Model 10-8673FIC) and the Britax Parkway (Model E904157) produced by Britax Corporation, Charlotte, N.C. The Graco TurboBooster SafeSeat model has armrests, whereas the Britax Parkway is a model that does not. The molded back configuration of the Britex booster seat helps to position the child.

All such booster seat models sit freely on the vehicle seat and when in use, both the child and seat are strapped, as a unit, by the vehicle seat belt. In concept, the seat belt serves to limit the motion of both the child and the booster seat in a forward crash. When the child is then thrown forcefully back, the unfixed booster seat is thought to act as a buffer to cushion the child's rebound. This is opposed to the child being thrown forward and away from a seat that is fixed to a vehicle, in which case the seat would not cushion the rebound. Booster seats with and without backs appear to operate this way in a collision, and, at least in a forward crash, there is no present data to suggest enhanced safety of one design over another. When booster seats are used, it is desirable that the positioning of restraints for children be the same as for an adult; that is, for the lap portion of the restraint to fit snugly cross the child's lap, and the "shoulder" portion of the restraint to cross the collar bone (not the face or throat) and chest.

The process of "buckling" a seat belt involves inserting a "latch plate," typically a flat metal configuration at the end of retractable seat belt webbing, into a "clasp," "latch," or "buckle" (synonymous) that is anchored to the body of the vehicle. The latch plate and the buckle are secured together by a clasping mechanism within the buckle, and the latch plate is released by a release mechanism within the buckle. Such devices are well known in the art. The process of putting a child in a booster seat therefore involves first positioning the booster seat on the vehicle seat, seating the child upon it, drawing the seat belt across the child and booster seat and finally inserting the seat belt latch plate into the seat belt buckle to buckle the belt about both the child and booster seat.

Seat belt buckles are typically positioned approximately at the level of the junction of the seat and seat back of the vehicle, somewhat above this level, or slightly recessed. Often, the buckle is not stationarily anchored, but anchored to the vehicle by a movable material such as flexible seat belt material. This flexible arrangement allows the buckles to be moved out of the way when not in use to secure a passenger, and does not ordinarily pose a problem for adult use. A seated adult can look down to visualize the buckle or easily reach down to feel for the buckle. If needed, a seated adult can use one hand to hold the buckle steady and the other hand to insert the latch plate.

In the case of using a child booster seat, it is recognized that when a booster seat is placed on a vehicle seat, the seat belt buckle typically becomes visually obscured from an adult positioned at the vehicle door and that visualizing the buckle requires bending into the vehicle to look over the booster seat. Moreover, the seat buckle cannot be physically accessed without reaching over the booster seat. An individual wishing to secure a child into a seat belt is characteristically required to look over both the child and the booster seat to find the buckle, as it cannot be readily seen over the booster seat and child's legs. The individual must then reach one or both arms over the child and the booster seat to insert the latch plate into the buckle. These problems are amplified by booster seats with armrests that further obscure view and manual access to the latch.

When the buckle is movable, as at the end of flexible seat belt webbing, the buckle may have fallen or retracted into the crease between the seat and seat back, or the booster seat may have moved to cover the buckle when the child was getting into the seat. These common events require the adult to "go fishing" to find the buckle, and if the booster seat has moved to cover the buckle, securing the child requires moving the booster seat about or tilting it with the child in it, to grope for the buckle. If the child is irritable or uncooperative, these difficulties with buckling a child in a booster seat are, of course, worsened.

An alternative to leaning into the vehicle and over the child to buckle a seat belt is for the individual to place the child into the booster seat, close the vehicle door, and enter the other side of the vehicle in order to better visualize and access the seat belt buckle. This has the drawback of leaving the child alone in the vehicle momentarily. By the time the adult reaches the other side, the child may move, get out of the seat, doze off, or even fall out of the seat. The option of buckling a child from the "other side" is therefore not usually convenient or desirable, and also is not a viable option if there are intervening children seated.

In the event of two or three child seats next to each other, finding seat belt buckles may require manual separation of the child seats, and groping into a narrow space between adjacent child seats or under adjacent seats (that may have children in them). Buckling a child when adjacent booster seats are present may require contorting to hold the seats apart with one hand and attempting to negotiate the latch plate into the buckle with the other. Importantly, if the buckle is not clearly visualized or positively accessed, there is an added risk of the seat belt not being properly fastened. Lastly, leaning over the child to find the buckle and buckle the seat belt necessitates placing an ear in direct proximity to the child's mouth for the duration of the procedure. This is unpleasant if the child is crying or screaming.

Therefore, what is needed is a system that improves upon the above-described inconveniences and problems. What is also needed is a system that positions and immobilizes vehicle seat belt buckles for easier accessibility when used with a child booster seat. What is further needed is a system that encourages child booster seat use.

SUMMARY OF THE INVENTION

The present invention derives from a recognition that buckling a child in a booster seat poses difficulties that can result from the positioning and/or mobility of vehicle seat belt buckles. Getting children placed in booster seats is therefore a present challenge, and measures to facilitate ease and convenience of use are desirable to foster compliance with using child vehicle booster seats. The present invention seeks to improve upon these inconveniences and problems by providing a means to position and immobilize automotive seat belt buckles so that they can be more easily accessed in conjunction with child booster seats. Despite the desired use of child booster seats in automobiles and other vehicles, devices to improve upon the aforementioned problems and thereby encourage booster seat use are not presently available for an ordinary user.

Thus, it is an object of the present invention to provide a booster seat system that improves the convenience, and reduce the difficulty of using child booster seats. It is another object of the present invention to provide a booster seat system that enhances compliance with booster seat utilization by making the booster seat easier to use. It is a further object of the present invention to provide a booster seat system that helps transform a movable seat belt buckle into a relatively fixed one, and thereby make it easier to buckle a child into a booster seat than at present. It is still another object of the present invention to provide a booster seat system that positions a seat belt buckle to where it is manually accessed more easily when using a child booster seat than at present. It is yet a further object of the present invention to provide a booster seat system that requires less exertion than is now required when buckling a child in a booster seat. It is another object of the present invention to provide a booster seat system that is relatively simple to use and inexpensive, that will improve upon the incompatibilities between the structures of adult seat belt configurations and child booster seats. It is still a further object of the present invention to provide a booster seat system that facilitates engagement of the vehicle seat belt when fastening a child in a vehicle booster seat within a vehicle.

The present invention achieves these and other objectives by providing a seat belt buckle positioning system that serves to more certainly position a seat belt buckle proximate to the side of a booster seat. The seat belt buckle positioning system of the present invention includes elements of a seat belt buckle holder (or belt buckle holder, or buckle holder), a seat belt buckle holder positioner (or buckle holder positioner) and an attachment mechanism for connecting the two. The seat belt buckle holder of the present invention is a structure that can envelope or otherwise grasp a vehicle seat belt that is attached to a vehicle by flexible material such as an ordinary seat belt webbing. A buckle holder positioner of the present invention is a structure that is configured to attach to a seat belt buckle holder and position it (and correspondingly position a seat belt buckle) at the side of the child booster seat.

In one embodiment of the present invention, the buckle holder positioner has a side panel configured for adjustable and removable attachment of a seat belt buckle holder.

In another embodiment of the present invention, the characteristics of the buckle holder positioner are incorporated into the side of a child booster seat and the seat belt buckle holder can be removably attached to this structure.

In still another embodiment of the present invention, the characteristics of the buckle holder positioner are incorporated into the side of a child booster seat, and the seat belt buckle holder is non-removably attached. In this case, the buckle holder and/or buckle holder positioner have adjustable means to accommodate various lengths of the seat belt buckle anchoring material.

In yet another embodiment, the seat belt buckle holder positioner may be configured as a rigid extension extending from the buckle holder for disposition adjacent to the seat back cushion and/or the seat cushion of a vehicle seat thus serving to maintain the seat belt buckle holder at a desired location next to which the child booster seat can be placed. This embodiment is considered less desirable than other embodiments since such a structure may still allow the seat belt buckle some movement, although more limited, which could increase the difficulty of inserting the seat belt latch into the seat belt buckle.

BRIEF DESCRIPTION OF THE DRAWINGS

FIG. 2*a* is a front view of the buckle holder of the embodiment shown in FIG. 1.

FIG. 2*b* is a front view of the buckle holder of the embodiment shown in FIG. 2*a* showing the position of the seat belt buckle within the buckle holder.

FIG. 3*a* is a top view of the buckle holder of the embodiment shown in FIG. 2.

FIG. 3b is a top view of the buckle holder shown in FIG. 3a showing the position of the seat belt buckle within the buckle holder.

FIG. 4 is a side view of the buckle holder of the embodiment shown in FIG. 2.

FIG. 5 is a perspective view of the buckle holder positioner shown in FIG. 1.

FIG. 6 is a side plan view of the buckle holder, buckle holder positioner and a booster seat.

FIG. 7 is an enlarged, cross-sectional side view of the buckle holder attached to the buckle holder positioner.

FIG. 9 is a plan view of one embodiment of the present invention in kit form.

FIG. 10 is a front view of the buckle holder of the embodiment shown in FIG. 9.

FIG. 11 is a back view of the buckle holder of the embodiment shown in FIG. 10.

FIG. 12 is a top view of the buckle holder of the embodiment shown in FIG. 10.

DETAILED DESCRIPTION OF THE PREFERRED EMBODIMENT

Figure 1:
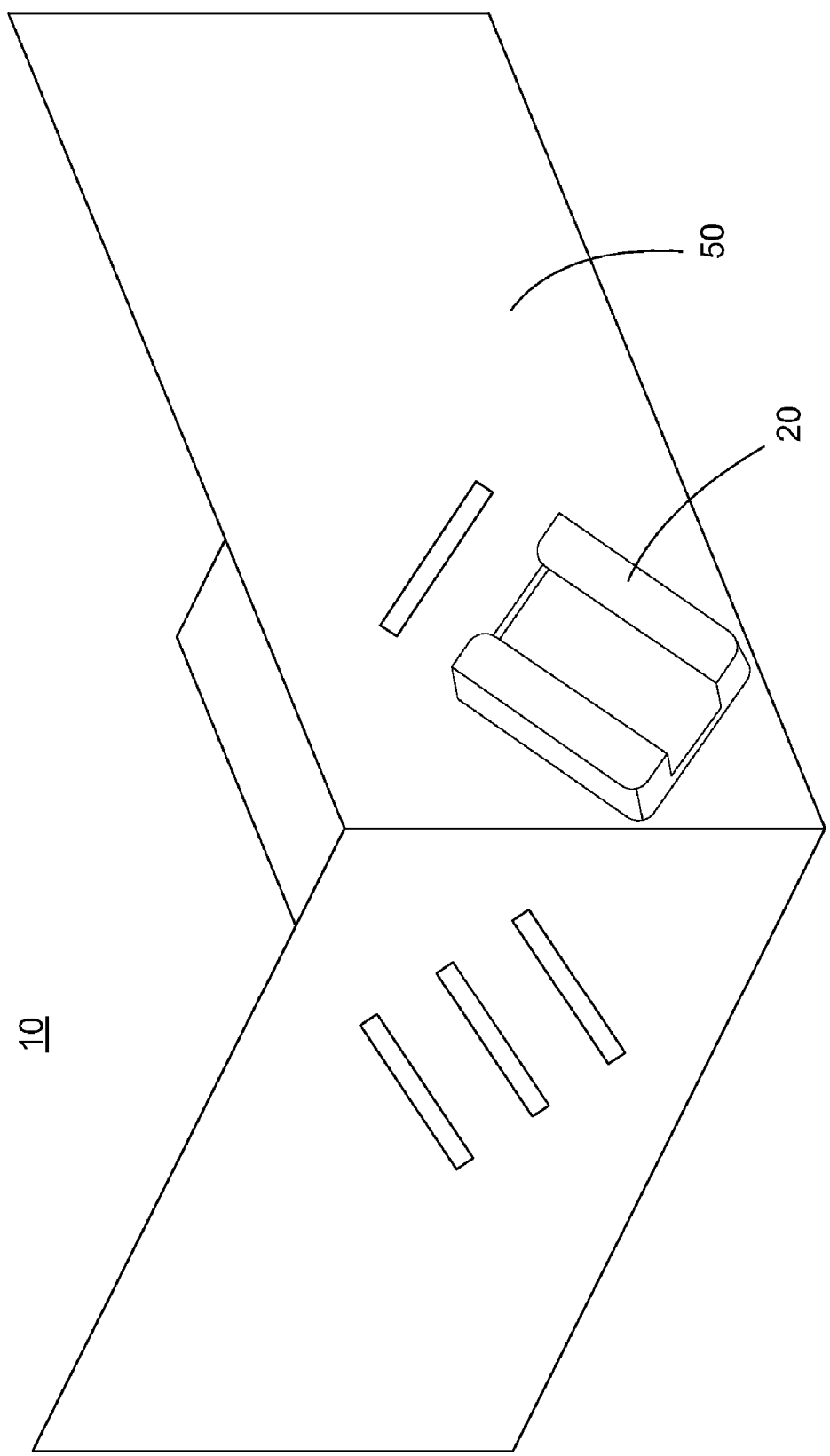
FIG. 1 is a perspective view of one embodiment of the present invention showing the seat belt buckle holder and the buckle holder positioner.

The preferred embodiment(s) of the present invention is illustrated in FIGS. 1-12. FIG. 1 illustrates one embodiment of the present invention showing a seat belt positioning system 10 for use with a child booster seat placed on a seat of a vehicle. Seat belt positioning system 10 includes a seat belt buckle holder 20 and a buckle holder positioner 50. Seat belt buckle holder 20 is preferably removable and adjustable and positioned and connected to buckle holder positioner 50 to accommodate the seat belt buckle of a vehicle when the seat belt positioning system 10 is used.

Turning now to FIGS. 2-4, there is illustrated seat belt buckle holder 20. FIG. 2a is a front view of seat belt buckle holder 20, which includes a first front panel 22, a second front panel 24 spaced from first front panel 22 defining a front opening 30, a bottom 26, a back panel 28 connected to the first front panel 22 by a first side panel 23 (not shown) and to the second front panel 24 by a second side panel 25, (not shown), and an attachment mechanism 32. Seat belt buckle holder 20 defines a volume with an open top 29 (not shown) for receiving and holding a vehicle seat belt buckle. In this configuration, the front opening 30 between first and second front panels 22, 24 accommodates entry of the flexible anchoring material attached to the vehicle's seat belt buckle thereby allowing the vehicle's buckle to be slipped into the buckle holder for assembly. FIG. 2b shows the embodiment of seat belt buckle holder 20 shown in FIG. 2a assembled together with a vehicle seat belt buckle 1. The anchoring material 3 of the seat belt buckle 1 is seen to extend from the seat belt buckle 1 and buckle holder 20. As noted, anchoring material 3 is often made of fabric the same as or similar to the material of the seat belt itself, and is therefore flexible. The use of anchoring material that is the same or similar to the seat belt ordinarily results in the buckle not being fixed in place.

FIG. 3a is a top plan view of seat belt holder 20 illustrated in FIG. 2a. First and second side panels 23, 25 are clearly shown connecting back panel 28 to first and second front panels, 22, 24, respectively. Bottom 26 contains a bottom notch or bottom opening 27. Bottom opening 27 accommodates anchoring material 3 of seat belt buckle 1. FIG. 3b is a top plan view of FIG. 3a with seat belt buckle 1 positioned within the space defined by the various panels of seat belt holder 20. As can be seen from FIG. 3b, open top 29 provides access to seat belt buckle 1 for latching the retractable seat belt of the vehicle.

Turning now to FIG. 4, there is illustrated a side plan view of seat belt buckle holder 20 showing second side panel 25 connected to second front panel 24 and back panel 28. In this embodiment, attachment mechanism 32 comprises an L-shaped extension having a first flange 33 that extends perpendicularly from back panel 28 adjacent to and away from open top 29 and then a second flange 34 extends from first flange 33 parallel to back panel 28.

FIG. 5 shows one embodiment of buckle holder positioner 50. In this embodiment, buckle holder positioner 50 includes a first positioner side 52, a second positioner side 54, and a positioner bottom 56. First positioner side 52 and second positioner side 54 have a plurality of attachment positioner slots 58. Attachment positioner slots 58 are sized to receive attachment mechanism 32 of buckle holder 20. The plurality of attachment positioner slots 58 allows adjustable attachment of the seat belt buckle holder 20. Looking downward (toward the interior aspect of the positioner), the first positioner side 52 may be considered the right side while second positioner side 54 may be considered the left side. Accordingly, when it is desired that the seat belt buckle of the vehicle be used on the right side of the child, the first positioner side 52 is placed to the right side of the booster seat and the second positioner side 54 is placed against the back of the vehicle seat. In the alternative, when the seat belt buckle of the vehicle will be used on the left side of the child, the second positioner side 54 is placed to the left side of the booster seat and the first positioner side 52 is placed against the back of the vehicle seat.

Although the buckle holder positioner 50 is shown having positioner sides 52, 54 and positioner bottom 56, it should be understood that alternative embodiments might include only the first and second positioner sides 52, 54 and no bottom, a partial bottom, and/or one side or the other. As long as such alternative embodiments provide assured and desired positioning of the seat belt buckle holder, they are considered consistent with the present invention.

FIG. 6 is a side view of seat belt buckle holder positioner 50 and seat belt buckle holder 20 in functional relationship to a child booster seat 100 that has an arm 102. The buckle holder positioner 50 is shown placed on a vehicle seat 104 and adjacent to the vehicle seat back 106. Seat belt buckle 1 is held by seat belt buckle holder 20. The anchoring material 3 of seat belt buckle 1 is seen to extend downward and backward from seat belt buckle 1 toward its attachment to the vehicle. Seat belt buckle holder 20 is joined to buckle holder positioner 50 through an attachment mechanism, which, in this case, is one of a plurality of attachment positioner slots 58.

In assembling this embodiment of the seat belt positioning system, it is desirable for the buckle holder positioner 50 to be attached by the assembler (i.e., the individual assembling the seat belt positioning system in the vehicle) at a distance that extends the anchoring material 3 so as to maintain the seat belt buckle 1 within seat belt buckle holder 20, i.e. drawing the buckle downward into seat belt buckle holder 20. Proper assembly in this case therefore requires the assembler to select one of the plurality of attachment positioner slots 58 that is best suited to the length of the seat belt buckle anchoring material 3, which is known to vary from vehicle to vehicle.

FIG. 7 is an enlarged, partial, cross-sectional view of the attachment mechanism 32 of seat belt buckle holder 20 within one of the plurality of attachment positioner slots 58 of buckle holder positioner 50. As can be seen from FIG. 7, first flange 33 and second flange 34 of attachment mechanism 32 form an L-shaped extension of seat buckle holder 20 and pass through one of the plurality of attachment positioner slots 58. Second flange 34 extends up along the side of positioner 50 to reversibly retain seat belt buckle holder 20.

Assembling this embodiment of the present invention is relatively simple and easy. Seat belt buckle holder 20 is slipped over the seat belt buckle 1 to encase or sheath seat belt buckle 1 but to leave exposed the part of seat belt buckle 1 that receives a seat belt latch plate from the retractable seat belt of the vehicle. Once the seat belt buckle 1 is situated within seat belt buckle holder 20, seat belt buckle holder 20 is then attached to buckle holder positioner 50. In this embodiment, the attachment mechanism 32 containing first and second flanges 33, 34 is inserted into one of the plurality of attachment positioner slots 58 that best matches the length of the anchoring material 3 of seat belt buckle 1. After first and second flanges 33, 34 of attachment mechanism 32 are fully inserted into one of the plurality of attachment positioner slots 58, the child booster seat is placed against the seat belt positioning system and is ready for use. A child can now be seated on the booster seat and held with one hand if need be while the other hand retrieves the retractable seat belt and inserts the seat belt latch into the seat belt buckle 1 that is being held in position by seat belt holder 20 without the need to use two hands to latch the seat belt.

It is contemplated that other mechanisms to attach seat belt buckle holder 20 to buckle holder positioner 50 might be employed, including, but not limited to, screws, snaps, buckles, adhesives, reversible adhesives, hook and loop type fasteners, and other non-reversible and reversible fastening means as are known in the art. Such attachment means or combination of means are considered to be within the scope of the invention including those alternative embodiments of Provisional Patent Application Nos. 60/777,762 and 60/785,121 and 60/808,347, all of which are incorporated herein by reference.

Alternative embodiments of seat belt buckle holder positioner 50 are also contemplated, as has been noted. For example, buckle holder positioner 50 may have only a right side, or a left side (and therefore not a surface adjacent to the automotive seat back when in position), or sides and no bottom. Other design configurations can also be used to hold the seat belt buckle positioner 50 in place such as extensions that allow it to sit on the automotive seat, or fit into the groove between the seat and seat back. It is also contemplated that other designs for seat belt buckle holder 20 that would serve to both hold the buckle and attach to seat belt buckle holder positioner 50 are possible within the art, and are considered within the scope of the invention.

Figure 8:
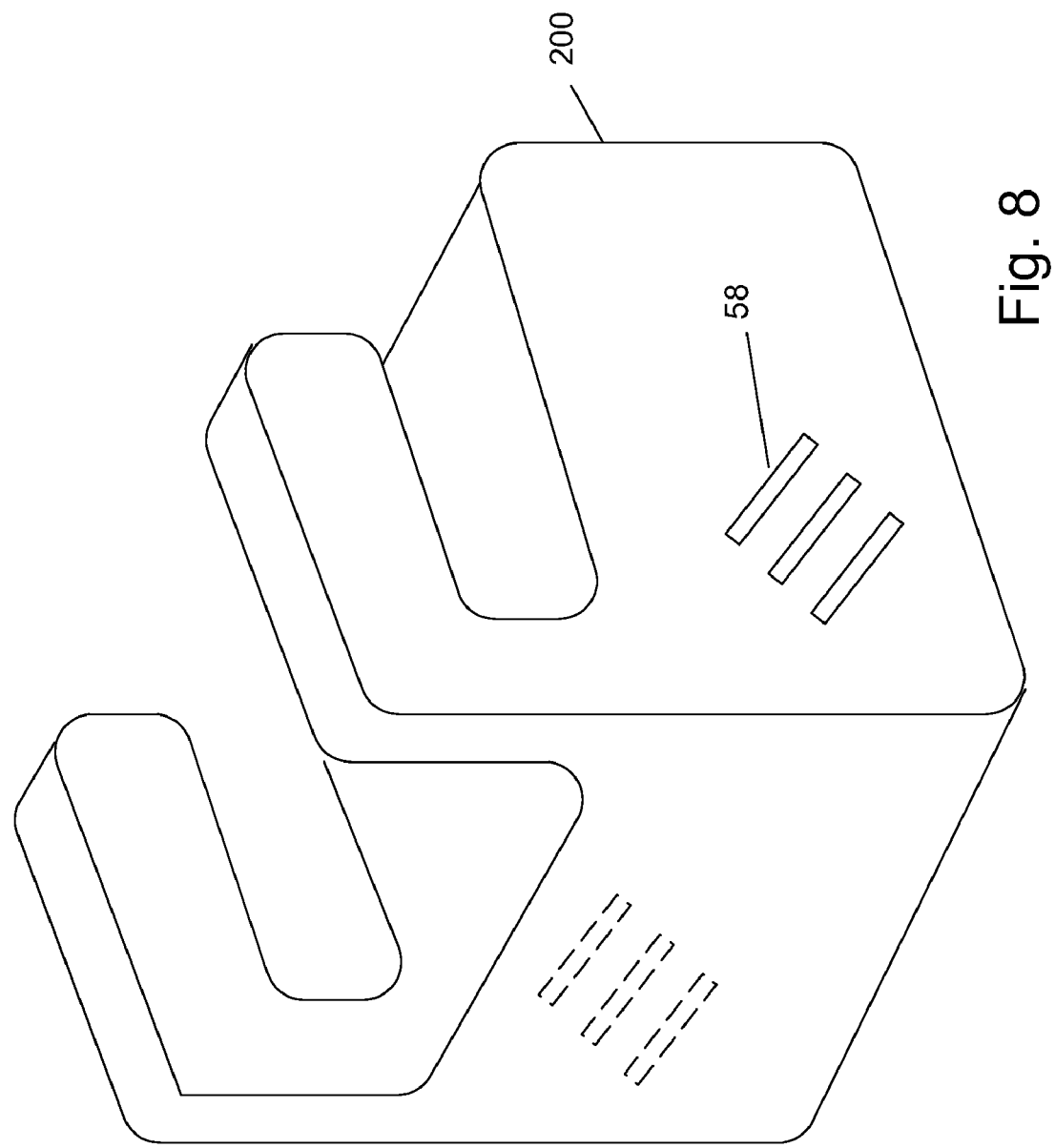
FIG. 8 is a perspective view of a child booster seat incorporating one embodiment of the characteristics of the buckle holder positioner of the present invention.

It is further contemplated that the buckle holder positioner 50 of the present invention might alternatively be incorporated into the booster seat itself, rather than being a separate component from the booster seat as depicted in FIGS. 1, 5, and 6. For example, adjusting slots 58 might be incorporated on the sides of a booster seat 200 as shown in FIG. 8, in which case that aspect of the booster seat side itself might be considered analogous to the buckle holder positioner 50 of the embodiment illustrated in FIG. 6. With such a configuration, it is considered desirable not to anchor the booster seat to the vehicle by way of the vehicle's buckle in the event of an accident, but rather allow the booster seat to move so as to cushion the rebound. This might be accomplished by a reversible attachment between the booster seat and buckle holder 20, or by providing for the buckle holder or buckle holder positioner to fail under force of collision. While construction of the elements of the invention with plastic molded parts would appear suitable, cost effective, and commensurate with the materials of child booster seats, it is contemplated that the device of the present invention might be constructed of other materials or a combination of materials including wood and metal, and to include rigid, semi-rigid, or flexible parts.

It is also noted that the seat belt buckle positioning system 10 may be provided in an embodiment in kit form where the kit includes a buckle holder 20, a buckle holder positioner 50, and instructions 70 for assembling and using the seat belt buckle positioning system with a child booster seat in a vehicle. The buckle holder positioner 50 in such an embodiment may be a flat sheet with foldable areas 60 and a connecting system 62 to hold the side panels 52, 54 together as illustrated in FIG. 9. This type of structure is amenable for space-saving and relatively inexpensive packaging. As illustrated in this embodiment, the plurality of attachment positioner slots 58 have a curvilinear shape.

Turning now to FIGS. 10-12, there is illustrated the curvilinear shaped attachment mechanism 32. FIG. 10 shows a seat belt buckle holder 20 with right and left front panels 22, 24, a front opening 30, a bottom 26, a back panel 28, and an attachment mechanism 32. FIG. 11 more clearly illustrates the curvilinear shape of attachment mechanism 32 in this embodiment. Attachment mechanism 32 includes a curvilinear-shaped first flange 33 and a second flange 34. Second flange 34 may or may not be curvilinear shaped. The only important characteristic of second flange 34 is that second flange 34 extends behind the side panel of buckle holder positioner 50 through a positioner slot 58 to be retained by buckle holder positioner 50. As seen in FIGS. 11 and 12, the curvilinear-shaped attachment mechanism 32 is shorter than the width of the seat belt buckle holder 20 and may optionally be shorter than the positioner slots 58 to allow limited, pivotable adjustment of the seat belt buckle holder 20 when connected to buckle holder positioner 50.

The illustrated embodiment of the present invention has been tested in a number of vehicles to ascertain that the seat belt buckle holder 20 can be readily installed, that is, that the seat belt buckle can be "scooped up" inside the seat belt buckle holder. In some instances in which the buckle is very close to the vehicle seat, the spongy seat and seat back material may need to be manually depressed to allow room for this to be accomplished. In assembling the seat belt buckle holder 20 and buckle holder positioner 50 together, a desired position has been usually achieved with a first try and only occasionally is a second adjustment required.

It can be appreciated that when assembled, devices of the present invention would act to hold an ordinary seat belt buckle in an area at the side of a booster seat that is knowable and readily accessed by a user. Using a device of the present invention, the seat belt buckle and seat belt latch plate are considerably and more easily coupled, as compared to when the buckle is movable. Embodiments of the present invention have been found to facilitate buckling by a caregiver, and even allow consistent buckling by an older child (with the adult checking, nonetheless, to insure that the child is secure).

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A seat belt buckle positioning system for use with a child booster seat, said seat belt positioning system comprising:

a seat belt buckle holder; and a seat belt buckle holder positioner wherein said seat belt buckle holder has a
holder grasping means to hold a vehicle seat belt buckle connected to a seat belt web material and a holder attaching means to connect to said seat belt buckle holder positioner and wherein said seat belt holder positioner has at least a positioner side for placement adjacent the child booster seat and at least a bottom portion for placement under the child booster seat, said positioner side having positioner connecting means to connect to said holder attaching means;

said seat belt positioning system adapted to accommodate a child booster seat placed against the seat belt positioning system.

2. The seat belt buckle positioning system of claim 1 wherein said buckle holder includes an opening for accommodating the web material connected to a seat belt buckle.

3. The seat belt buckle positioning system of claim 1 wherein said positioner connecting means is adjustable.

4. The seat belt buckle positioning system of claim 1 wherein said holder attaching means includes a flanged, L-shaped extension of said seat belt buckle holder and said positioner connecting means is a slot in said buckle holder positioner for receiving said L-shaped extension in an interlocking relationship.

5. The seat belt positioner system of claim 1 wherein said holder attaching means and said positioner connecting means are one or more of screws, snaps, buckles, adhesives, reversible adhesives, and hook-and-loop fasteners.

6. The seat belt buckle positioning system of claim 1 wherein said positioner connecting means is reversible or non-reversible.

7. A seat belt buckle positioning system for use with a child booster seat, said seat belt positioning system comprising:
a seat belt buckle holder having a recess configured for holding a seat belt buckle of a vehicle and an open end for temporarily receiving a seat belt latch into the seat belt buckle;
a seat belt buckle holder positioner having at least a positioner side that is configured to be placed adjacent the child booster seat and at least a bottom portion for placement under the child booster; and
an attachment mechanism for connecting said seat belt holder to said buckle holder positioner;
said seat belt positioning system adapted to accommodate a child booster seat placed against the seat belt positioning system.

8. The system of claim 7 wherein said attachment mechanism includes a flanged, L-shaped extension of said seat belt buckle holder and a slot in said positioner side of said buckle holder positioner for receiving said L-shaped extension in an interlocking relationship.

9. The system of claim 7 wherein said attachment mechanism is one or more of screws, snaps, buckles, adhesives, reversible adhesives, and hook-and-loop fasteners.

10. The system of claim 7 wherein said attachment mechanism is positionally adjustable to fully extend the vehicle seat belt web material connected to the seat belt buckle.

11. A method of facilitating the use of a child booster seat in a vehicle, said method comprising:
assembling a seat belt buckle holder together with a vehicle seat belt buckle wherein said buckle holder has a recess configured for holding the seat belt buckle and an open end for temporarily receiving a seat belt latch into the seat belt buckle;

assembling said seat belt buckle holder together with a buckle holder positioner wherein said buckle holder positioner has at least a positioner side for placement adjacent the child booster seat and at least one of a bottom portion for placement under the child booster seat or a transverse side portion for placement behind the child booster seat wherein said positioner side, said bottom portion and said transverse side portion lack any interlocking structural member for directly fastening said buckle holder positioner to said child booster seat, said seat belt buckle holder being connected to said side;

positioning said assembled seat belt buckle, said seat belt buckle holder, and said buckle holder positioner on the vehicle seat; and placing the child booster seat against said buckle holder positioner wherein a side of the child booster seat is adjacent said positioner side of said buckle holder positioner.

12. The method of claim 11 further comprising:

seating a child on said booster seat;

drawing a seat belt around both the child and booster seat; and inserting a seat belt latch plate into the seat belt buckle within said seat belt buckle holder.

13. A method of facilitating the use of a child booster seat in a vehicle, said method comprising:
obtaining a rigid seat belt buckle holder having a recess configured for holding a seat belt buckle, an open end for temporarily receiving a seat belt latch into the seat belt buckle, and a back panel with a flanged, L-shaped extension connected to said back panel of said seat belt buckle holder;

obtaining a child booster seat that has at least one slot formed in a side of said child booster seat for receiving said L-shaped extension of said seat belt buckle holder in a interlocking relationship, and placing said child booster seat onto a vehicle seat adjacent a vehicle seat belt buckle;

inserting the vehicle seat belt buckle into said recess of said seat belt buckle holder; and connecting said L-shaped extension of said seat belt buckle holder to said slot of said buckle holder positioner into an interlocking relationship.

14. The method of claim 13 further comprising:

seating a child on said booster seat;

drawing a seat belt about said child and said booster seat; and inserting a seat belt latch plate into the seat belt buckle within said seat belt buckle holder.

15. A kit for stationarily positioning a seat belt buckle for use with a child booster seat, said kit comprising:
a seat belt buckle holder having a recess configured for holding a seat belt buckle and an open end for temporarily receiving a seat belt latch into the seat belt buckle;
a seat belt buckle holder positioner having at least a positioner side for placement adjacent the child booster seat and at least a bottom portion for placement under the child booster seat, said seat belt buckle holder positioner and said seat belt buckle holder having an attachment mechanism adapted for adjustably and removably connecting said seat belt buckle holder to said positioner side said seat belt positioning system adapted to accommodate a child booster seat placed against the seat belt positioning system; and instructions for assembling and using said seat belt buckle holder and said seat belt buckle holder positioner with said child booster seat in a vehicle.

16. The kit of claim 15 wherein said seat belt holder positioner is a planar sheet assembly having one or more predefined creases for bendably forming said positioner side and said at least one of said bottom portion for placement under the child booster seat or said transverse side portion for placement behind the child booster seat.

17. The kit of claim 15 wherein said seat belt holder positioner has a connecting system formed in said positioner side and said at least one of said bottom portion or said transverse side portion to maintain the assembled shape of said seat belt holder positioner upon assembly.

* * * * *